United States Patent
Briquet

(10) Patent No.: US 10,913,255 B2
(45) Date of Patent: Feb. 9, 2021

(54) METHOD FOR PRINTING ON AN EXTERIOR FACE OF LAMINATED GLAZING

(71) Applicant: SAINT-GOBAIN GLASS FRANCE, Courbevoie (FR)

(72) Inventor: Clément Briquet, Elincourt Sainte Marguerite (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 33 days.

(21) Appl. No.: 16/334,984

(22) PCT Filed: Sep. 18, 2017

(86) PCT No.: PCT/FR2017/052484
§ 371 (c)(1),
(2) Date: Mar. 20, 2019

(87) PCT Pub. No.: WO2018/055268
PCT Pub. Date: Mar. 29, 2018

(65) Prior Publication Data
US 2019/0263105 A1    Aug. 29, 2019

(30) Foreign Application Priority Data

Sep. 21, 2016 (FR) .................................. 16 58837

(51) Int. Cl.
*B32B 38/00* (2006.01)
*B32B 17/10* (2006.01)
(Continued)

(52) U.S. Cl.
CPC ...... *B32B 38/145* (2013.01); *B32B 17/10036* (2013.01); *B32B 17/10165* (2013.01);
(Continued)

(58) Field of Classification Search
CPC ........ B32B 17/10036; B32B 17/10165; B32B 17/10889; B32B 17/10981; B32B 37/12;
(Continued)

(56) References Cited

U.S. PATENT DOCUMENTS 6,495,261 B1    12/2002   Gagliardi et al.
2003/0154868 A1    8/2003   McEvoy et al.

FOREIGN PATENT DOCUMENTS

EP    0 553 003 A1    7/1993
EP    0 773 706 A2    5/1997

OTHER PUBLICATIONS

Translation of International Search Report as issued in International Patent Application No. PCT/FR2017/052484, dated Dec. 6, 2017. (Year: 2017).*

(Continued)

*Primary Examiner* — George R Koch
(74) *Attorney, Agent, or Firm* — Pillsbury Winthrop Shaw Pittman LLP

(57) ABSTRACT

A method for manufacturing a laminated glazing includes a first and a second sheet of glass which are bonded together by an adhesive interlayer, that face of the first sheet of glass that faces toward the second including a first printed pattern; in which method the position of the first printed pattern is measured using a camera; a printing robot is positioned in a printing station relative to the measurement of the position of the first printed pattern and a second printed pattern is printed on the opposite face of the second sheet of glass from the first; and the sheets of glass are set down in a bending oven.

7 Claims, 1 Drawing Sheet

Figure 1:
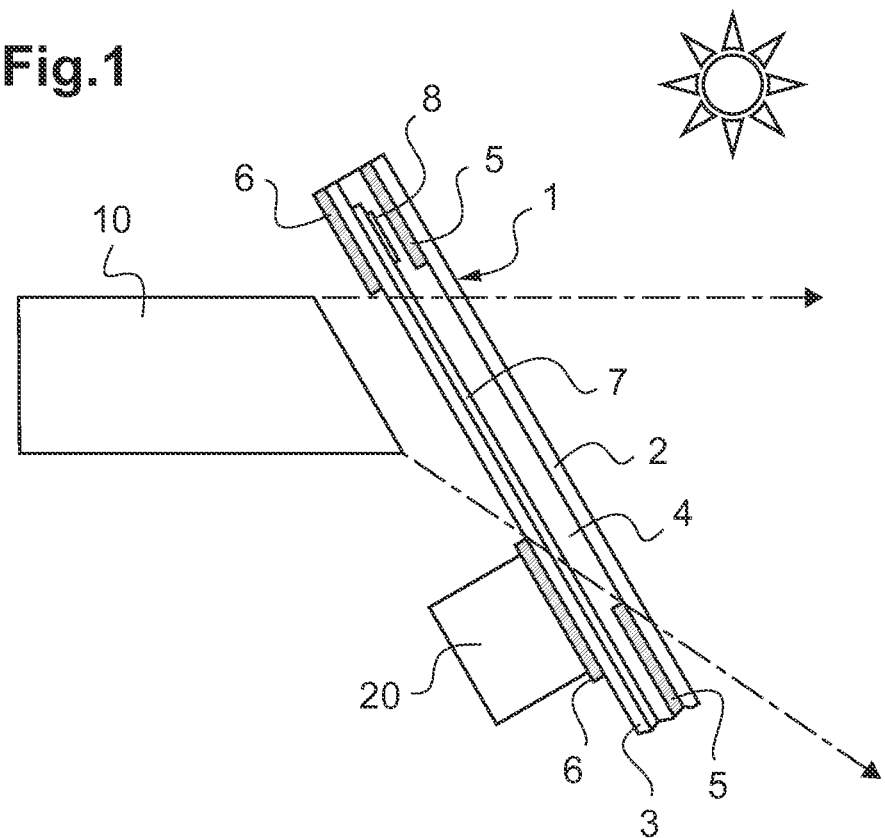

(51) Int. Cl.
*B32B 37/12* (2006.01)
*C03C 17/00* (2006.01)

(52) U.S. Cl.
CPC .. *B32B 17/10889* (2013.01); *B32B 17/10981* (2013.01); *B32B 37/12* (2013.01); *B32B 38/0012* (2013.01); *C03C 17/002* (2013.01); *B32B 2605/00* (2013.01)

(58) Field of Classification Search
CPC . B32B 38/0012; B32B 41/00; B32B 2041/04; C03C 17/002
See application file for complete search history.

(56) References Cited

OTHER PUBLICATIONS

International Search Report as issued in International Patent Application No. PCT/FR2017/052484, dated Dec. 6, 2017.

\* cited by examiner

METHOD FOR PRINTING ON AN EXTERIOR FACE OF LAMINATED GLAZING

CROSS REFERENCE TO RELATED APPLICATIONS

This application is the U.S. National Stage of PCT/FR2017/052484, filed Sep. 18, 2017, which in turn claims priority to French Patent Application No. 1658837 filed Sep. 21, 2016, the entire contents of all applications are incorporated herein by reference in their entireties.

The invention relates to the laminated glazings used for building or for a transport vehicle, notably as a motor vehicle windshield liable to exhibit numerous functionalities and numerous accessories, among which mention may be made of the heated deicing/demisting layers, sunscreen layers, a mount or support for an interior rear-view mirror or for stereoscopic cameras, a rain detector, etc.

It is known practice to equip such laminated glazings with opaque, for example black, screen-printed enamel to hide the bead of adhesive bonding the glazing to the bodywork opening, the edges of the de-edged functional thin layers, which means to say layers of which a small peripheral strip has been subjected to ablation, the bus bars which consist of silvered screen prints and allow an electrically conducting (heating, etc.) functional layer to be connected to a source of electrical current, the mount for an interior rear-view mirror, the support or supports for stereoscopic cameras, the rain detector, etc. when viewed from outside and/or inside the vehicle as the case may be. In the remainder of the text, the sheets of glass constituting a laminated glazing will be referred to as "exterior"/"interior" with reference to the position in which they are mounted in the bodywork opening or in the building. Furthermore, it is common practice to number the faces of a laminated windshield for example from the face in contact with the exterior atmosphere in the mounted position; thus, the faces of a laminated windshield having two sheets of glass are numbered from 1 (for the exterior face) to 4 for the face in contact with the atmosphere of the vehicle interior.

In order to hide some of the aforementioned elements of a laminated windshield having two sheets of glass for example from the outside of the vehicle, it is known practice for the interior face of the exterior sheet of glass (face 2) to be provided with screen-printed black enamel. In the equivalent way, in order to hide from the inside, or even also from the outside of the vehicle, some of said aforementioned elements, it is advantageous for the interior face of the interior sheet of glass (face 4 of a laminated glazing having two sheets of glass) to be provided with black enamel. The general practice is to print, notably by screen printing, onto the flat (namely pre-bending) substrate, of which the opposite face from the one on which printing is performed (for example in this instance the face 3) is generally placed on a support such as a conveyor belt. However, the face 3 of a laminated windshield having two sheets of glass often has a functional layer such as a sunscreen layer, or a heating layer, for example a bilayer or trilayer of silver, or alternatively tin-doped indium oxide (better known as Indium Tin Oxide, ITO), and, in the case of a heating layer, bus bars (silvered screen printing) formed in contact with the electrically conducting layer with the objective of connecting it to a source of electrical current; thus, the region of the layer comprised between two bus bars is heating. These functional layers on face 3 are often de-edged, which means to say, as already mentioned, that a peripheral strip has been eliminated (by ablation, etc.) therefrom; it is advantageous for the edges of such de-edged layers to be concealed from view from the outside or from the inside of the vehicle.

What is more, these possibly de-edged layers and the bus bars they bear are incompatible with contact with a conveyor belt or similar support, which carries the risk of scratching the layers, and tearing or damaging the bus bars.

It is therefore an object of the invention to make available a method for manufacturing a laminated glazing in which the opposite face of a sheet of glass from the one that is provided with a functional layer and possibly with bus bars, which is (are) fragile, is printed, notably by screen printing.

This objective is achieved by the invention which accordingly relates to a method for manufacturing a laminated glazing comprising a first and a second sheet of glass which are bonded together by an adhesive interlayer, characterized in that it comprises the operations consisting in pairing the first and second sheets of glass while they are flat then setting them down in a relative position close to the position they are intended to occupy in the laminated glazing, in a printing station, using a gripping tool which moves the one relative to the other only in the direction perpendicular to their main surface, that face of the first sheet of glass that faces toward the second sheet of glass comprising a first printed pattern;

using a camera to measure the position of said first printed pattern on the first sheet of glass;

positioning a robot that has one or more print heads in said printing station relative to the measurement of the position of the first printed pattern, validating its position with respect to the first and second sheets of glass and printing a second printed pattern on the opposite face of the second sheet of glass from the first sheet of glass; and setting the first and second sheets of glass down in a bending oven using a gripping tool which moves the one with respect to the other only in the direction perpendicular to their main surface.

According to the invention, the second printed pattern is screen printed at the moment of the pairing of the two sheets of glass and before they are transferred into the bending oven. It is thus possible to use tools for gripping sheets of glass, notably via their edge face, which are able to move the one relative to the other only in the direction perpendicular to their main surface when they are as close together as possible, or even without there being necessarily any contact between them. Thus, they may nevertheless come into contact with one another, but in the direction perpendicular to their main surface, so that neither the first pattern printed on the first sheet of glass (face 2), nor the de-edged functional layer and bus bars of the face of the second sheet of glass that faces toward the first (face 3) carry the risk of being damaged.

The invention is possible thanks to the unknown use of a robot having one or more print, notably screen-printing, heads.

The first and second sheets of glass may be set down in the bending oven, stacked and in contact with one another, on a sag bending frame. The firing of the second printed pattern takes place in the bending oven.

According to preferred features of the method of the invention:

in order to measure the position of said first printed pattern of the first sheet of glass, the camera is positioned on the opposite side of the first sheet of glass from the second sheet of glass;

in said printing station, the second sheet of glass is stacked in a substantially horizontal position on top of the first sheet of glass, parallel to, and possibly a short distance from, the latter;

said one or more print head(s) is a (are) screen-printing or digital-printing head(s);

after the printing of the second printed pattern on the second sheet of glass and before the setting-down of the first and second sheets of glass in a bending oven, a camera is used to check the quality of the second printed pattern;

in order to check the quality of the second printed pattern, the camera is used to take a reflected picture of the latter and of the surface of the second sheet of glass on which it is printed; thus, through the contrast between the reflection off the enamel and that off the glass, any defects that may consist either in a lack of enamel in the region of the second printed pattern (transparent defect) or in an overspill of the enamel outside of the intended surface for the second printed pattern (opaque defect, generally black) are detected; insofar as the second sheet of glass is stacked on top of the first, illumination from above can therefore be employed; this checking operation is performed before the setting-down in a bending oven;

if the quality of the second printed pattern is considered to be insufficient, the robot with one or more print heads which produced it is taken away for maintenance and replaced by an equivalent other robot.

Another subject of the invention is a laminated glazing for a building or land, air or aquatic transport vehicle, notably an automotive vehicle, obtained by a method as described hereinabove, characterized in that said first sheet of glass is intended to face toward the exterior atmosphere and said second sheet of glass is intended to face toward the interior of the building or of the transport vehicle.

According to preferred features of this laminated glazing:

it constitutes a motor vehicle windshield and that face of the second sheet of glass that faces toward the first sheet of glass bears a, possibly de-edged, functional layer;

the functional layer is electrically conducting and connected to a source of electrical current by bus bars;

it is equipped, in its central upper part when in the mounted position, with an interior rear-view mirror, with two stereoscopic cameras and possibly with a rain detector.

Figure 2:
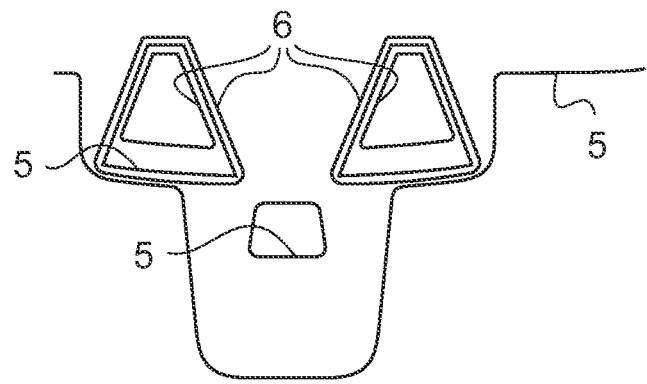

The invention will be better understood in the light of the attached drawings in which FIG. 1 is a schematic view in section of the central upper part of a motor vehicle windshield according to the invention; and FIG. 2 depicts, in a schematic face-on view of this central upper part of a windshield, the superposed boundaries of said first and second printed patterns.

With reference to FIG. 1, the central upper part of the laminated windshield 1 is depicted inclined as in the position in which it is mounted in the bodywork opening. Although it has been depicted flat, the windshield is curved. It is made up of a first sheet of soda-lime-silica float glass 2 intended to be in contact with the exterior atmosphere, and of a second sheet of soda-lime-silica float glass 3 intended to be in contact with the atmosphere of the interior of the motor vehicle. The sheets of glass 2 and 3 have identical or different thicknesses comprised between 1 and 3 mm, notably between 1.2 and 2.5 mm, for example of 1.5 or 2.1 mm;

they are bonded together by means of an adhesive interlayer 4, such as of polyvinylbutyral (PVB) 0.76 mm in thickness. The first and second sheets of glass 2 and 3 may, each independently of one another, be of any other composition, notably borosilicate, or intended for aeronautical applications.

The first and second sheets of glass 2, 3 define, from the exterior toward the interior of the vehicle, namely from right to left in the figure, four faces numbered from 1 to 4 (these are not indicated in the figure). The face 3 of the windshield 1 (the exterior face of the second sheet of glass 3) is provided with a heating thin layer 7 made up of a stack composed of two or three layers of silver, or alternatively of tin-doped indium oxide (better known as Indium Tin Oxide, ITO). The layer 7 is de-edged: a peripheral part of its surface has been removed by mechanical ablation; its edge is therefore set back in relation to that of the laminated glazing 1. The layer 7 is electrically conducting and connected to a source of electrical current by bus bars 8 made up of silvered screen printing; one bus bar 8 provided along the upper side of the glazing 1 collaborates with a bus bar provided along the lower side thereof and not depicted in order to create, within the layer 7, a difference in potential such that its zone comprised between the two bus bars is heating.

The laminated windshield 1 is equipped with two stereoscopic cameras 10 which are able to detect and register the distance between the obstacles closest to the vehicle in the forward direction, in order possibly to influence the acceleration/braking of the motor vehicle. Two arrows symbolizing the angle of view of one stereoscopic camera 10 have been indicated schematically. The mount for a rear-view mirror—support for stereoscopic cameras 20 has also been depicted.

The face 2 of the laminated windshield (the interior face of the first sheet of glass 2) is provided with black enamel screen printing (the first printed pattern) 5. This 5 allows the peripheral bead of adhesive, not depicted, that bonds the glazing 1 to the bodywork opening, most of the rear-view mirror mount—support for the stereoscopic cameras 20, the de-edged edge of the heating layer 7 and the bus bars 8 to be hidden from the view of an exterior observer.

It can be seen in FIG. 1 that the required aperture for the angle of sight of the stereoscopic cameras 10 does not allow the surface of the first printed pattern 5 to be extended far enough to completely hide the mount—support 20 from being seen from the outside.

For that reason, in particular that face 4 of the laminated windshield (the interior face of the second sheet of glass 3) is also provided with black enamel screen printing (the second printed pattern) 6, by means of which the mount—support 20 is bonded to this face 4 (interior face of the windshield 1). The second printed pattern 6 therefore also contributes to hiding this mount—support 20 from view from the outside. The second printed pattern 6 also, for the most part, hides the de-edged edge of the layer 7 and the bus bars 8 from view from the interior of the motor vehicle.

With reference to FIG. 2, the first and second printed patterns 5 and 6, which are in different thicknesses of the laminated glass 1 as was seen hereinabove, are depicted superposed.

The first printed pattern 5 extends over a peripheral strip of the windshield 1 and opposite most of the mount—support 20. It comprises two trapezoidal holes corresponding to the areas of transparency needed for viewing by the stereoscopic cameras 10, as well as, below these two holes in the figure, a trapezoidal hole with rounded corners corresponding to a region of transparency needed for a rain detector, to which, in particular, actuation of the windshield wipers may be slaved.

The second printed pattern 6 delimits the areas of view of the stereoscopic cameras 10.

The invention claimed is:

1. A method for manufacturing a laminated glazing comprising a first and a second sheet of glass which are bonded together by an adhesive interlayer, the method comprising:

pairing the first and second sheets of glass while the first and second sheets of glass are flat then setting them down in a relative position close to the position the first and second sheets of glass are intended to occupy in the laminated glazing, in a printing station, using a first gripping tool which moves one of the first and second sheets of glass relative to the other-one of the first and second sheets of glass only in a direction perpendicular to a main surface of each the first and second sheets of glass, a face of the first sheet of glass that faces toward the second sheet of glass comprising a first printed pattern;

using a first camera to measure a position of said first printed pattern on the first sheet of glass;

positioning a robot that has one or more print heads in said printing station relative to the measurement of the position of the first printed pattern, validating its position with respect to the first and second sheets of glass and printing a second printed pattern on an opposite face of the second sheet of glass from the first sheet of glass; and setting the first and second sheets of glass down in a bending oven using a second gripping tool which moves the one of the first and second sheets of glass with respect to the other one of the first and second sheets of glass only in the direction perpendicular to their main surface.

2. The method as claimed in claim 1, wherein the first sheet of glass includes a first main face and an opposite second main face, the second main face of the first sheet of glass facing the second sheet of glass and wherein, in order to measure the position of said first printed pattern of the first sheet of glass, the camera is positioned on a side of the first main face of the first sheet of glass.

3. The method as claimed in claim 1, wherein, in said printing station, the second sheet of glass is stacked in a substantially horizontal position on top of the first sheet of glass, parallel to said first sheet of glass.

4. The method as claimed in claim 1, wherein said one or more print heads is a (are) screen-printing or digital-printing head(s).

5. The method as claimed in claim 1, wherein after the printing of the second printed pattern on the second sheet of glass and before the setting-down of the first and second sheets of glass in a bending oven, a second camera is used to check a quality of the second printed pattern.

6. The method as claimed in claim 5, wherein in order to check the quality of the second printed pattern, the camera is used to take a reflected picture of the second printed pattern and of the surface of the second sheet of glass on which the second printed pattern is printed.

7. The method as claimed in claim 5, wherein if the quality of the second printed pattern is considered to be insufficient, the robot with one or more print heads which produced it is taken away for maintenance and replaced by an equivalent other robot.

* * * * *